(12) United States Patent
Nakashima

(10) Patent No.: US 6,369,807 B1
(45) Date of Patent: Apr. 9, 2002

(54) ONLINE CHARACTER ENTRY DEVICE

(75) Inventor: Yutaka Nakashima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/088,117

(22) Filed: Jun. 1, 1998

(30) Foreign Application Priority Data

Jun. 4, 1997 (JP) .............................................. 9-146244

(51) Int. Cl.$^7$ ................................................ G06F 3/03
(52) U.S. Cl. ..................................................... 345/179
(58) Field of Search ................................ 345/173, 179; 382/119, 181, 187, 188–189, 178–18.01, 18.03, 18.06, 18.07, 19.01, 19.03

(56) References Cited

U.S. PATENT DOCUMENTS

| | | | | |
|---|---|---|---|---|
| 4,680,804 A | * | 7/1987 | Kuzunuki et al. | 382/13 |
| 5,454,046 A | * | 9/1995 | Carman, II | 382/186 |
| 5,481,278 A | * | 1/1996 | Shigematsu et al. | 345/179 |
| 5,956,021 A | * | 9/1999 | Kubota et al. | 345/179 |
| 5,977,958 A | * | 11/1999 | Baro et al. | 345/179 |

FOREIGN PATENT DOCUMENTS

| | | |
|---|---|---|
| JP | 62-69388 | 3/1987 |
| JP | 6-19615 | 1/1994 |
| JP | 6-332610 | 12/1994 |
| JP | 8-286807 | 11/1996 |

OTHER PUBLICATIONS

Japanese Office Action issued Jan. 4, 2000 in a related application and English translation of relevant portions.

* cited by examiner

*Primary Examiner*—Almis R. Jankus
(74) *Attorney, Agent, or Firm*—Ostrolenk, Faber, Gerb & Soffen, LLP

(57) ABSTRACT

An online character entry device which enables a stable specified operation to be implemented without necessity of entry of specific stroke or provision of button switch and with condition that increase of processing amount is not much. There is formed a point from which a pen point does not shift during more than prescribed the time interval within the stroke of the entry character (hereinafter referring to stopping point), and there is provided a first stopping point detecting section for detecting the stopping point within the entry character, and a relevance word retrieval section for retrieving the relevance word using detection result of existence of the stopping point and recognition result concerning entry character, thus executing specified operation (for example, outputting formal name of company from abbreviation entry) prescribed beforehand.

10 Claims, 12 Drawing Sheets

| CHARACTER CODE | RELEVANCE WORD |
|---|---|
| A | AMERICA ELECTRIC CORPORATION |
| N | NEC CORPORATION |
| ... | ... |
| ... | ... |

ONLINE CHARACTER ENTRY DEVICE

BACKGROUND OF THE INVENTION

The present invention relates to an online character entry device in which hand-written character is inputted by online processing in use for an electronic notebook or a pen-computer.

DESCRIPTION OF THE PRIOR ART

In the conventional online character entry device, which causes hand-written character to be inputted due to online processing by using a pen, if it is capable of performing an abbreviation entry, the user of the online character entry device can implement entry of the character efficiently. The abbreviation entry is that the user does not input whole image of the character string, the commands, or the graphics which are in use repeatedly, but inputs prescribed simple image corresponding thereto. Further, if the user can implement elimination of stroke and so forth which are inputted erroneously, by simple operation, the operation is more efficient. Incidentally, the stroke denotes a figured line from pen-down to pen-up.

One example in which the abbreviation entry is capable of being realized is described in the Japanese Patent Application Laid-Open No. HEI 06-332610 (hereinafter referring to a first conventional example). Another example in which the elimination method for stroke and so forth is described in the Japanese Patent Application Laid-Open No. HEI 06-19615 (hereinafter referring to a second conventional example).

In the first conventional example, the user inputs beforehand a stroke (hereinafter referring to identification stroke) with prescribed specific configuration which means that it is abbreviation entry, in addition to recognizable character pattern such as alphabets simultaneously. When a recognition result concerning the recognizable character pattern is obtained, the character string or commands or the like which are registered beforehand corresponding to character code of the recognition result are outputted.

FIG. 1 is a block diagram showing a first conventional example. Referring to FIG. 1, the first conventional example includes a character entry unit 7, a data processor 8 which operates depend upon a program control, a storing unit 9 for storing information, and an output unit consisting of a display means and a printer.

The character entry unit 7 which consists of a tablet and so forth cause a stroke pattern which is a row of coordinate points sampled with fixed time interval concerning respective strokes of characters inputted to be stored into the storing unit 9. The storing unit 9 consists of a stroke storing section 901 and a relevance word correspondence storing section 902. The stroke storing section 901 stores a stroke pattern transferred from the character entry unit 7. The relevance word correspondence storing section 902 causes a pair of character string or commands or the like (hereinafter referring to relevance word) which becomes object of abbreviation entry and a character code corresponding thereto to be stored.

The data processing unit 8 consists of an identification stroke detecting section 801, an identification stroke eliminating section 802, a character recognizing section 803, and a relevance word retrieval section 804. The identification stroke detecting section 801 examines whether or not the identification stroke exists in the stroke pattern group stored in the stroke storing section 901, thus transferring the signal representing the result thereof (hereinafter referring to detection signal) both to the identification stroke eliminating section 802 and the relevance word retrieval section 804. The identification stroke eliminating section 802 determines whether or not it causes the stroke pattern to be eliminated based upon value of the detection signal transferred from the identification stroke detecting section 801, thus eliminating it if necessary. The character recognizing section 803 implements character recognition concerning the stroke pattern group transmitted from the identification stroke eliminating section 802. The relevance word retrieval section 804, when the detection signal from the identification stroke detecting section 801 is ON, separates relevance word corresponding to the character code of the character recognizing section 803 from the relevance word correspondence storing section 902.

Next, operation thereof is described by using FIGS. 1, 2, and 3. FIG. 2 is a flow chart showing operation of the first conventional example. FIG. 3 is a view showing an entry example of the first conventional example. The stroke storing section 901 stores a stroke pattern group for one character which is transferred from the character entry unit 7 (STEP C1). The identification stroke detecting section 801 detects an identification stroke among the stroke pattern group stored in the stroke storing section 901 (STEP C2), before transmitting the detection signal both to the identification stroke eliminating section 802 and the relevance word retrieval section 804. By way of the identification stroke, for example, as a stroke S14 shown in FIG. 3, the stroke whose shape is ◯ (a circle), and which is written down so as to envelope remaining stroke group is used. When the identification stroke is detected, the detection signal becomes ON (STEP C3). When the identification stroke is not detected, the detection signal becomes OFF (STEP C5). The identification stroke eliminating section 802 inputs therein the stroke pattern group stored in the stroke storing section 901 and the detection signal from the identification stroke detecting section 801. Further, the identification stroke eliminating section 802, when the detection signal is ON, eliminates the stroke pattern corresponding to the identification stroke from the stroke pattern group, thus transferring remaining stroke pattern to the character recognizing section 803(STEP C4). Furthermore, the identification stroke eliminating section 802, when the detection signal is OFF, transfers the stroke pattern group to the character recognizing section 803 as it is. In the case of FIG. 3, the stroke patterns corresponding both to the strokes S11, S12, and S13 are transferred to the character recognizing section 803. The character recognizing section 803 implements character recognition concerning the stroke pattern group transferred from the identification stroke eliminating section 802, thus transferring character code of the recognition result to relevance word retrieval section 804 (STEP C6). The relevance word retrieval section 804 receives the detection signal transferred from the identification stroke detecting section 801 and the character code from the character recognizing section 803, when the detection signal is ON, separating from the relevance word correspondence storing section to transfer the relevance word corresponding to the received character code to the output unit 4 (STEPs C8, C9). While when there is no relevance word corresponding thereto, or the detection signal is OFF, thus transferring the character code of the recognition result to the output unit 4 (STEP C10).

In the second conventional example, the user can eliminate the stroke which is inputted erroneously in such a way that it causes figured line (hereinafter referring to as identification partial stroke) with prescribed shape written continuously as it stands pen-down to be inputted therein.

FIG. 4 is a block diagram showing a second conventional example. Referring to FIG. 4, the device of the second conventional example includes a character entry unit 7, a data processing unit 11 which operates due to program control, a storing unit 12 for storing information, and an output unit 10 consisting of a display means and printer and so forth.

The character entry unit 7 is the same as that of the first conventional example, therefore description thereof is omitted. The storing unit 12 comprises a stroke storing section 1201. The stroke storing section 1201 stores the stroke pattern transferred from the stroke eliminating section 1102.

The data processing unit 11 includes an identification partial stroke detecting section 1101, a stroke eliminating section 1102, and a character recognizing section 803. The identification partial stroke detecting section 1101 examines whether or not the stroke pattern transferred from the character entry unit 7 includes the identification partial stroke, thus transferring signal indicating result thereof (hereinafter referring to as elimination signal) to the stroke eliminating section 1102. The stroke eliminating section 1102 determines whether or not it causes the stroke pattern to be stored in the stroke storing section according to value of the elimination signal. The character recognizing section 803 implements recognition concerning the stroke pattern group stored in the stroke storing section 1201.

Next, operation thereof is described referring to FIGS. 4, 5, and 6. FIG. 5 is a flow chart showing operation of the second conventional example. FIG. 6 is a view showing an entry example of the second conventional example. The stroke pattern is transferred both to the identification partial stroke detecting section 1101 and the stroke eliminating section 1102 from the character entry unit 7. The identification partial stroke detecting section 1101 examines whether or not the stroke pattern includes the identification partial stroke (STEP D2). By way of the identification partial stroke, for example, 2-rotational loops as shown in the stroke S17 of FIG. 6 is in use. When the identification partial stroke is involved in the stroke pattern, the stroke pattern is transferred to the stroke eliminating section 1102 while being ON of the elimination signal. When the identification partial stroke is not involved in the stroke pattern, the stroke pattern is transferred while being OFF of the elimination signal. The stroke eliminating section 1102, when the elimination signal is OFF, stores the stroke pattern transferred from the character entry unit 7 in the stroke storing section 1201. While when the elimination signal is ON, the stroke pattern is eliminated (STEP D3), thus being not stored in the stroke storing section 1201. When the stroke corresponding to one character is inputted (STEP D4), the character recognizing section 803 implements character recognition concerning the stroke pattern group stored in the stroke storing section 1201 (STEP C6), thus transferring character code of the recognition result to the output unit 10 (STEP D5). In the case of FIG. 6, the stroke S17 is eliminated, the recognition is implemented concerning respective stroke patterns for another strokes S15, S16, S18, and S19.

The first problem is that since the identification stroke with prescribed configuration or the identification partial stroke with the same should be inputted, a burden is required to the user.

Because in the first conventional example, the abbreviation entry is implemented using the identification stroke, and in the second conventional example, elimination of the stroke is implemented using the identification partial stroke.

The second problem is that amount of processing increase in quantity.

Because in the first example, processing for detecting the identification stroke, and further processing for eliminating the identification stroke in the recognition processing are required. In the second conventional example, processing for detecting the identification partial stroke is required.

The third problem is that stabilized operation is incapable of being implemented.

Because the circle or loop used as the identification stroke or the identification partial stroke are difficult to detect because shape thereof is unstable.

SUMMARY OF THE INVENTION

In view of the foregoing, it is an object of the invention to provide an online character entry device which does not necessitate entry of the specific stroke and does not have much amount of processing and is capable of implementing correction of the stroke and stable abbreviation entry.

In one arrangement to be described below by way of example in illustration of the invention, an online character entry device, in which hand-written character is inputted by online processing, includes a stopping point detecting section for detecting a stopping point from which a pen point does not shift during the prescribed time period within a stroke, and a specified operation section for executing a specified operation prescribed beforehand when the stopping point is detected.

In another arrangement to be described below by way of example in illustration of the invention, an online character entry device, in which hand-written character is inputted by online processing, includes a stopping point detecting section for detecting existing of a stopping point from which a pen point does not shift during the prescribed time period within the stroke and for measuring stopping time of the pen point, and a specified operation section for executing a specified operation prescribed beforehand in answer to the stopping time when the stopping point is detected.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENT

A preferred embodiment of the present invention will now be described in detail referring to the accompanying drawings.

Figure 1:
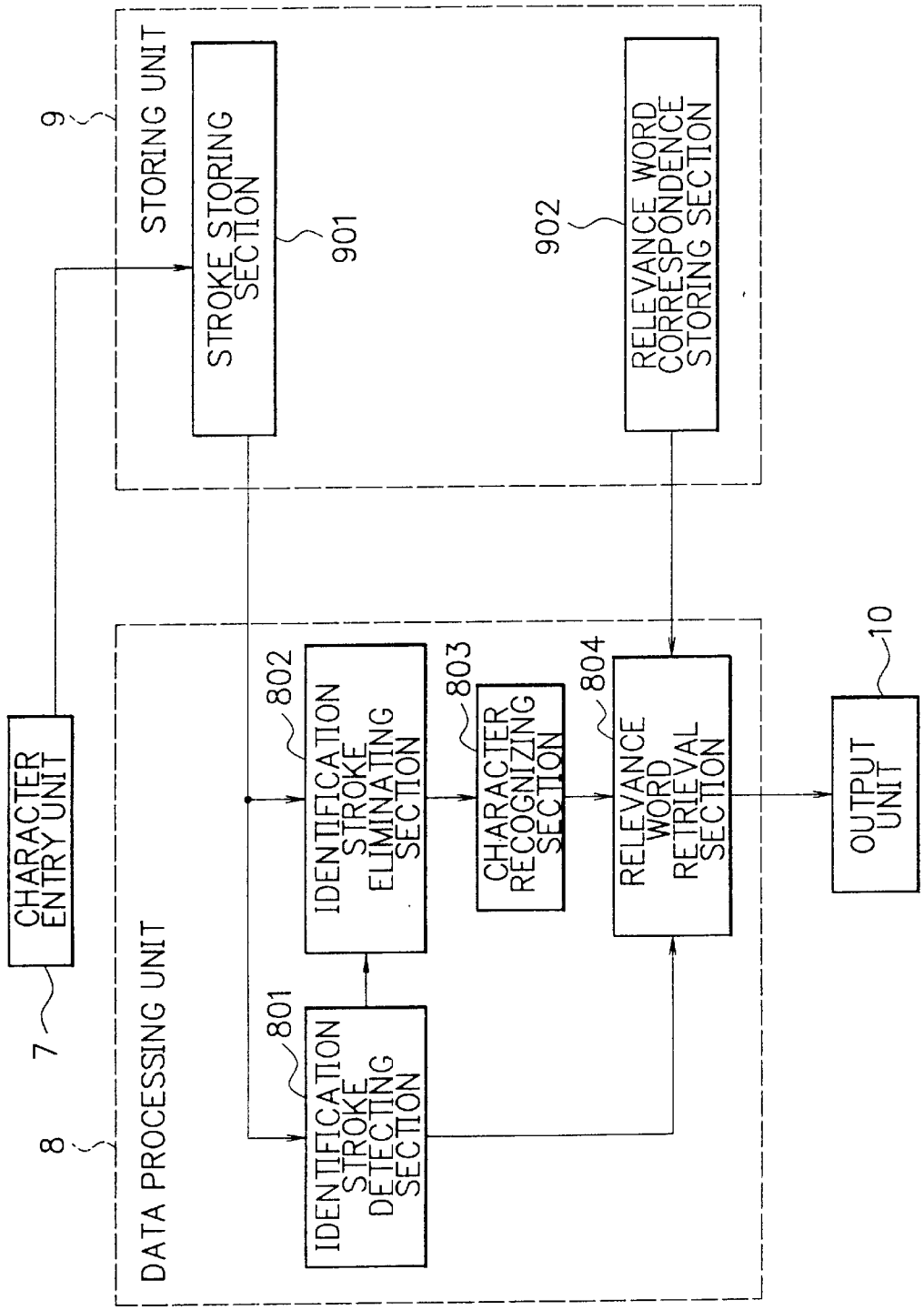
FIG. 1 is a block diagram showing a first conventional example.
Figure 2:
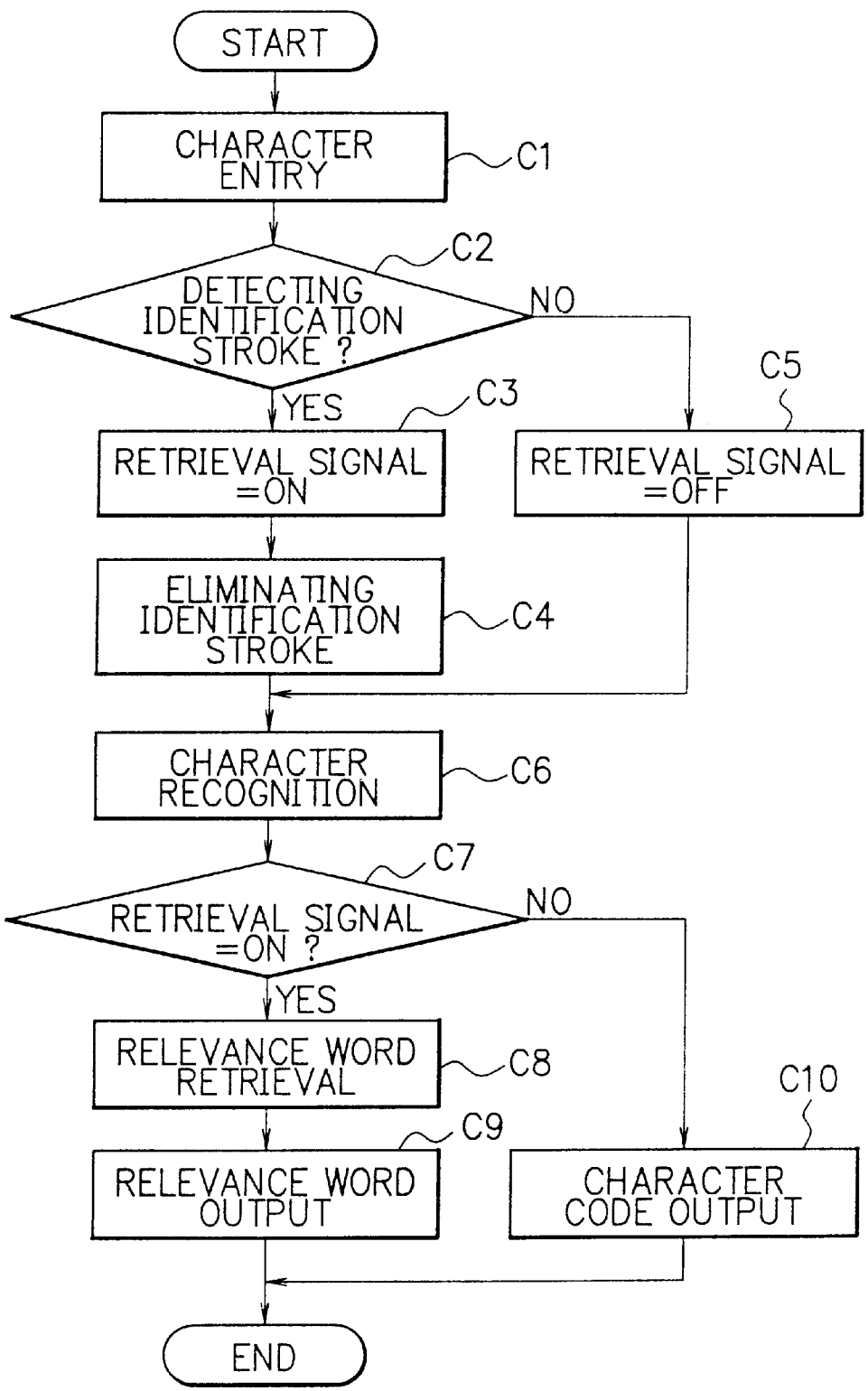
FIG. 2 is a flow chart showing an operation of the first conventional example.
Figure 3:
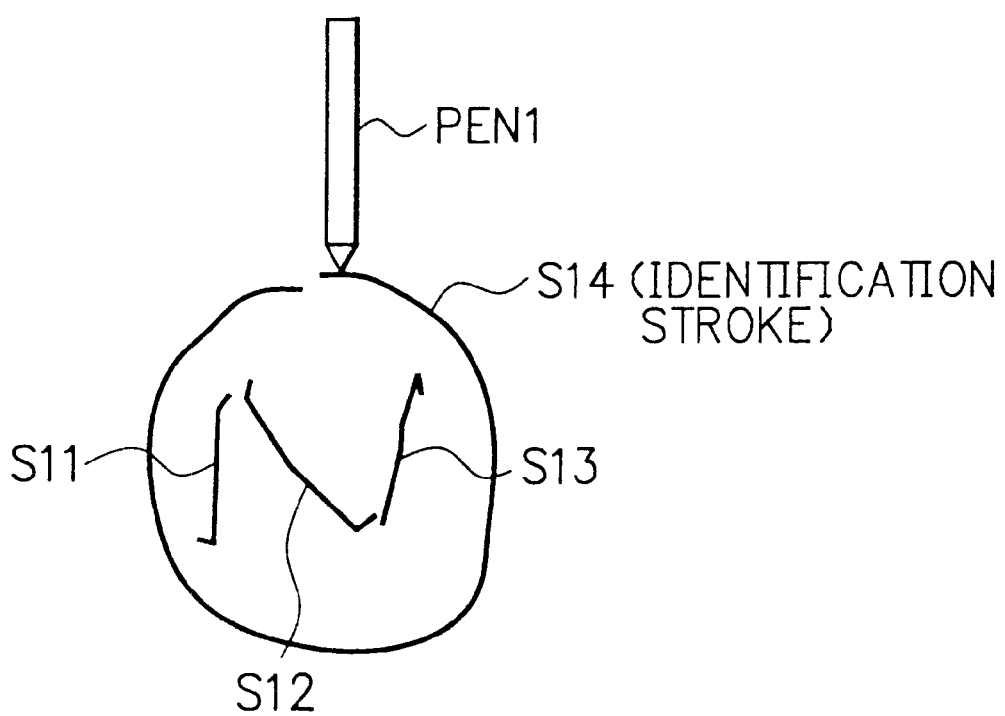
FIG. 3 is a view showing an entry example of the first conventional example.
Figure 4:
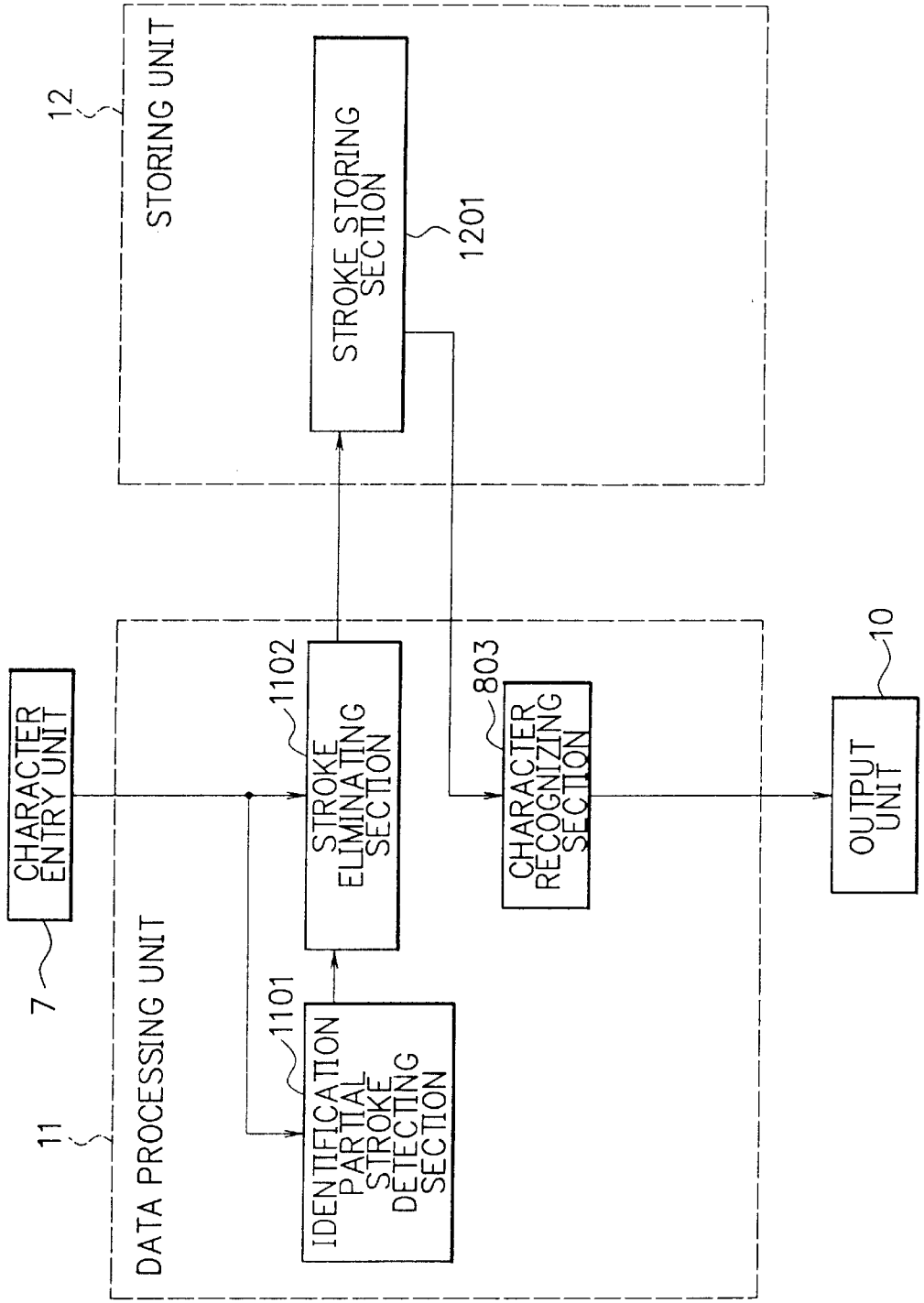
FIG. 4 is a block diagram showing a second conventional example.
Figure 5:
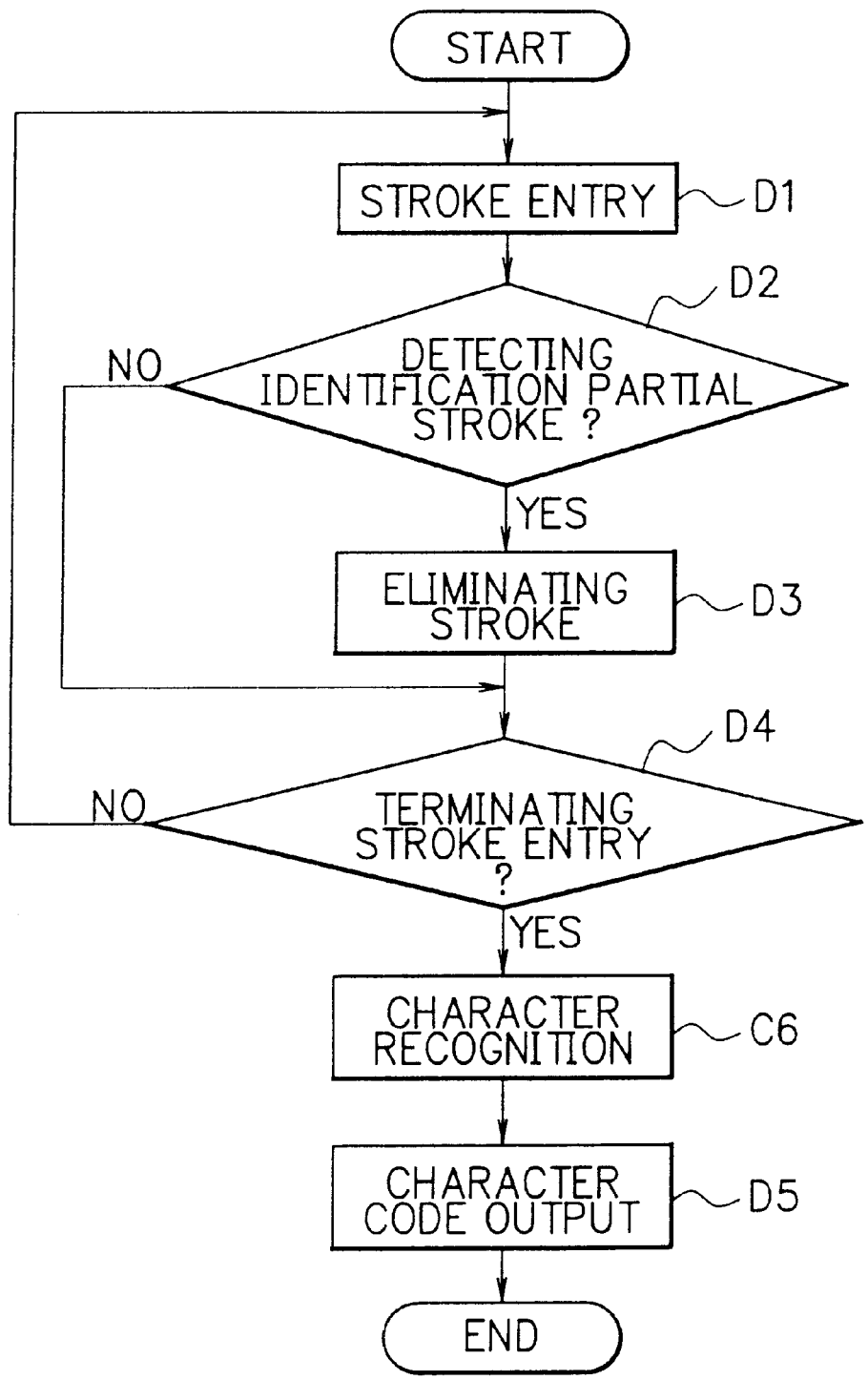
FIG. 5 is a flow chart showing an operation of the second conventional example.
Figure 6:
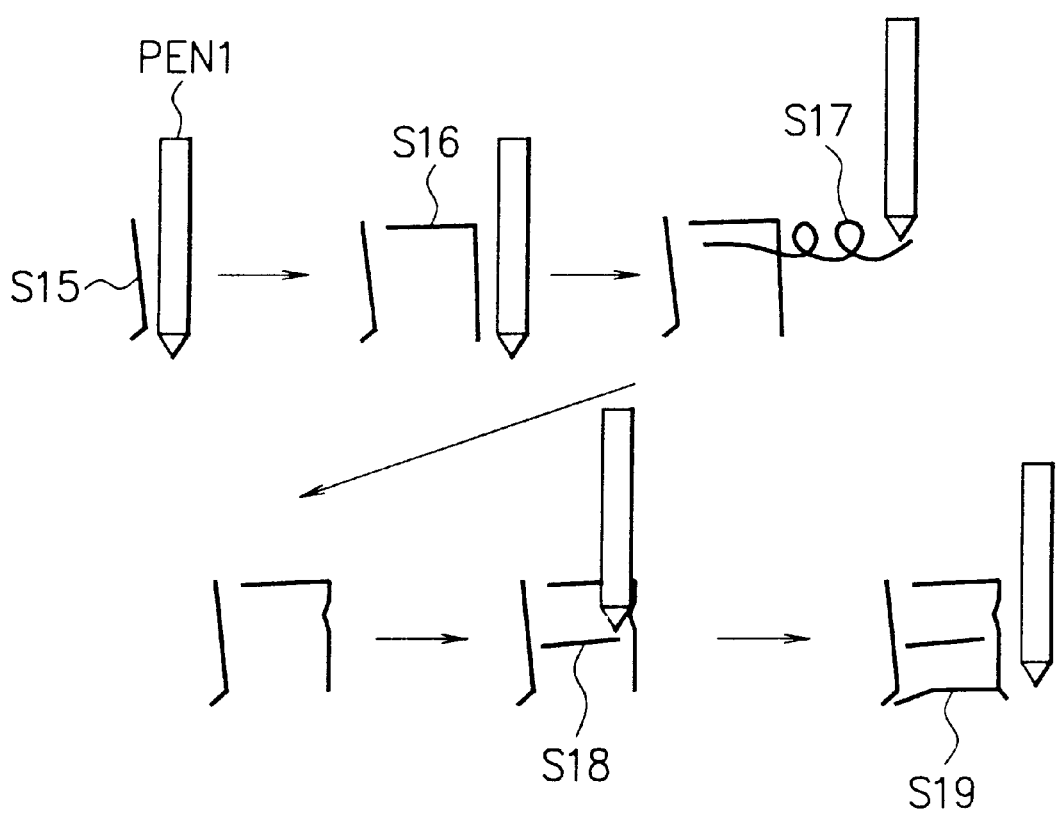
FIG. 6 is a view showing an entry example of the second conventional.
Figure 7:
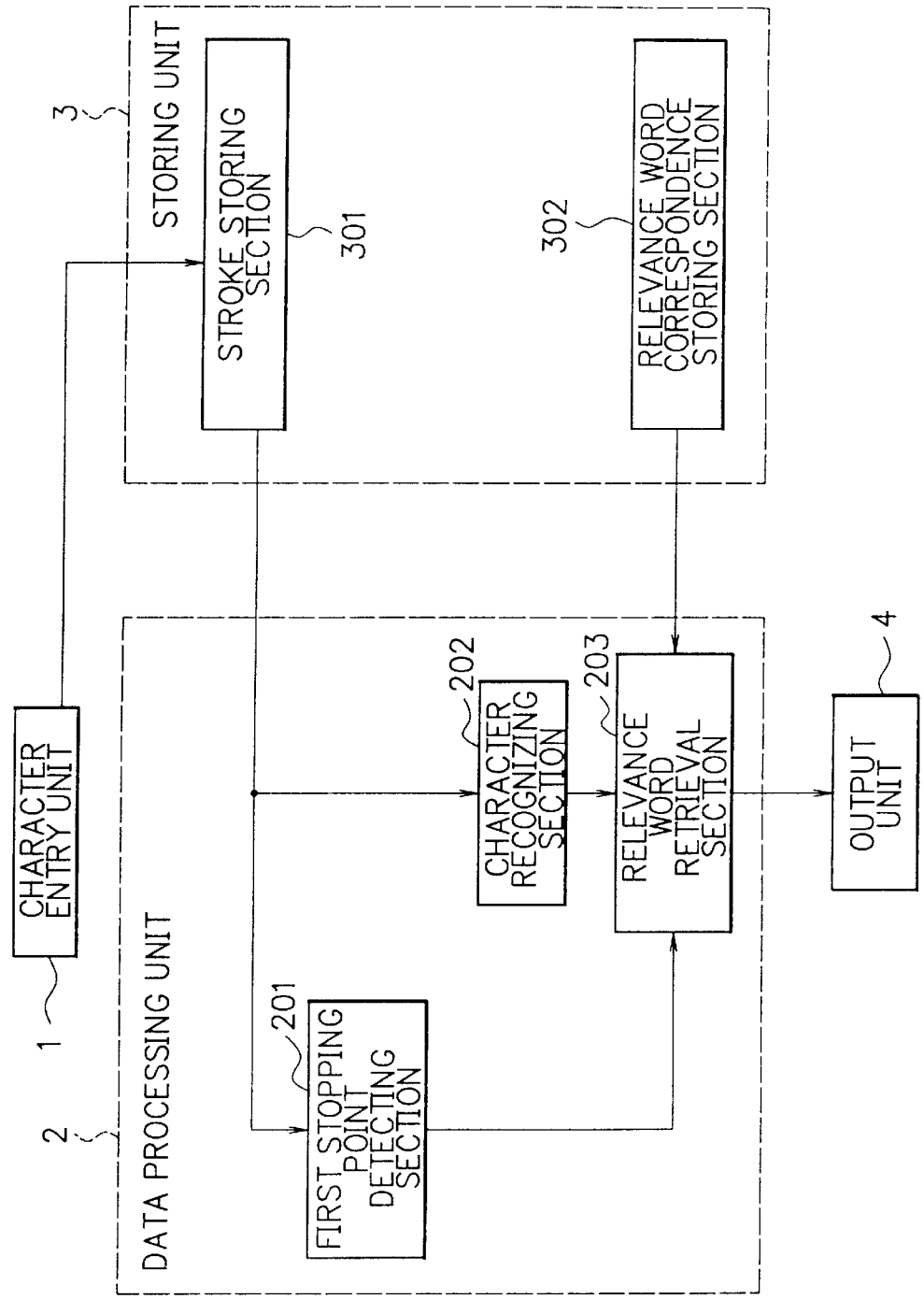
FIG. 7 is a block diagram shoring a first configuration according to the present invention.

FIG. 7 is a block diagram showing a first configuration of the present invention. Referring to FIG. 7, the first configuration of the present invention includes a character entry device 1, a data processing unit 2 which operates due to program control, a storing unit 3 for storing information, and an output unit 4 consisting of a display means, a printer and so forth.

The character entry unit 1 which comprises a tablet and so forth, causes the storing unit 3 to store a stroke pattern which is a row of coordinate points sampled by fixed time interval.

The storing unit 3 comprises a stroke storing section 301 and relevance word correspondence storing section 302. The stroke storing section 301 stores a stroke pattern transferred from the character entry unit 1. The relevance word correspondence storing section 302 causes pair of relevance word and character code corresponding thereto to be stored therein.

The data processing unit 2 comprises a first stopping point detecting section 201, a character recognizing section 202, and a relevance word retrieval section 203. The first stopping point detecting section 201 implements detection of stopping point concerning stroke pattern group, stored in the stroke storing section 301, before transferring signal for indicating detection result (hereinafter referring to stopping point detection signal) to the relevance word retrieval section 203. The character recognizing section 202 implements character recognition concerning the stroke pattern group stored in the stroke storing section 301. The relevance word retrieval section 203, when the stopping point detection signal from the first stopping point detecting section 201 is ON, separates a relevance word corresponding to the character code of the character recognizing section 202 from the relevance word storing section 302.

Figure 8:
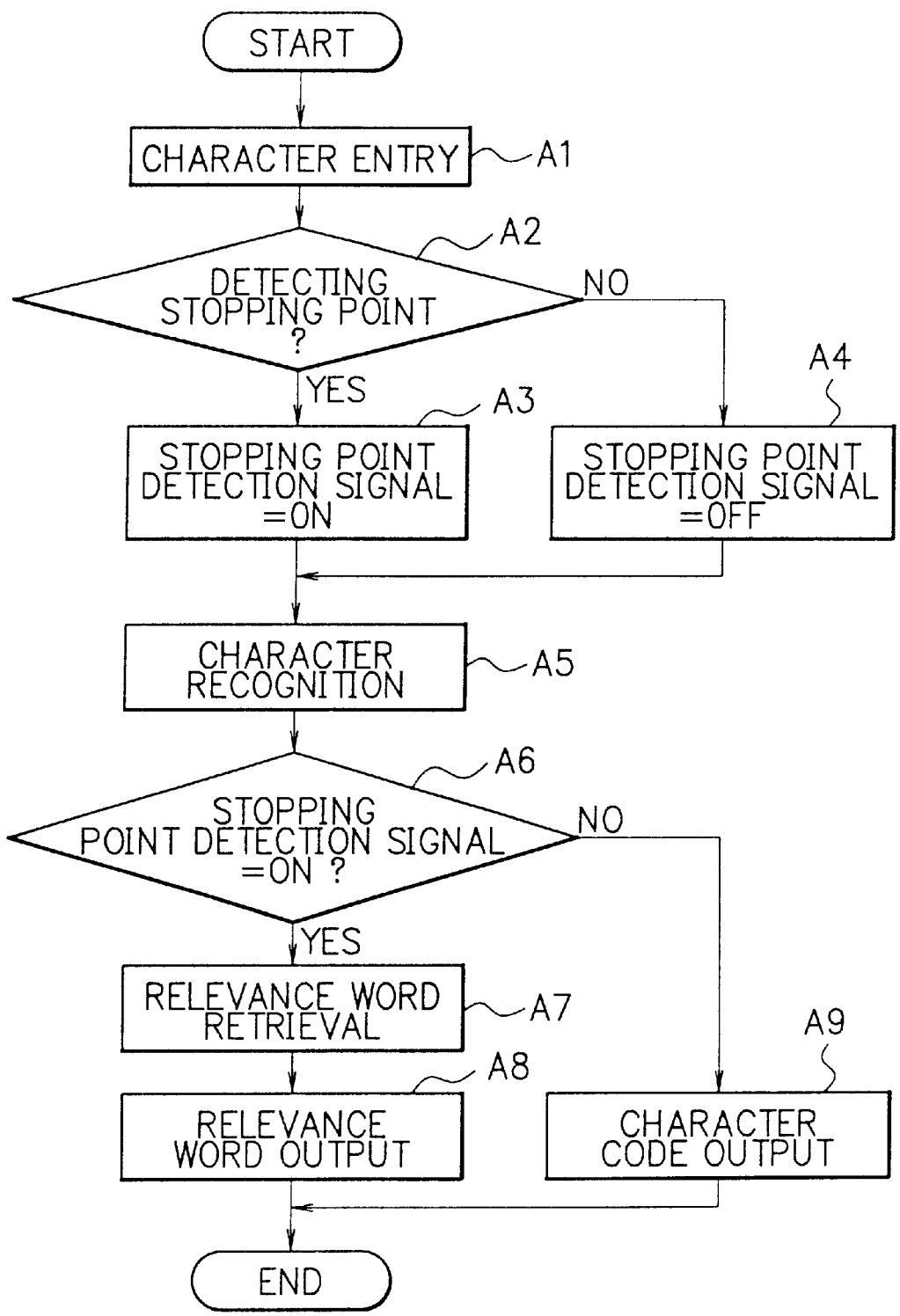
FIG. 8 is a flow chart showing an operation of the first configuration of the present invention.

Next, operation of the first configuration of the present invention will be described referring to FIGS. 7 and 8. FIG. 8 is a flow chart showing operation of the first configuration of the present invention. The character entry unit 1 stores the stroke pattern which is the row of the coordinate points sampled with fixed time interval successively, in terms of respective stroke of the inputted characters. When the stroke pattern for one character is stored (STEP A1), the first stopping point detecting section 201 examines whether or not the coordinate point having the same coordinate value exists continuously more than K pieces (K is value given beforehand) by way of the stopping point concerning the stroke pattern group stored in the stroke storing section 301, when the coordinate point exists, making up the stopping point detection signal to ON (STEP A3), while when the coordinate point does not exist, making up the stopping point detection signal to OFF (STEP A4), thus transferring the stopping point detection signal to the relevance word retrieval section 203. The character recognizing section 202 implements recognition concerning the stroke pattern group stored in the stroke storing section 301 by using the recognition system in which a representative stroke obtained due to clustering concerning respective both to directional characteristic and positional characteristic of the stroke that is described in the paper (hereinafter referring to citation document (1)) published entitled "On-Line Character Recognition Using Common Stroke Pattern Made by Clustering Method" [The Institute of Electronics, Information and Communication Engineers-1996 Parers of Speech of System Society], pp 372, 1996 September (STEP A5), before transferring the character code of recognition result to the relevance word retrieval section 203. The relevance word retrieval section 203, when the stopping point detection signal transferred from the first stopping point detecting section 201 is ON, separates the relevance word corresponding to the character code of the recognition result from the relevance word correspondence storing section 302, thus outputting to the output unit 4 (STEPs A7, A8). While when the stopping point detection signal is OFF, the character code is outputted to the output unit 4 as it is (STEP A9).

Next, there is described the effect brought by the first configuration. The first configuration of the present invention causes abbreviation entry to implement by using the stopping point capable of setting within entry characters, thereby entry of the identification stroke is not required so that the burden to the user is not frequent. Further, in the recognition processing, it is not required to eliminate the identification stroke.

Next, there is described the second configuration of the present invention referring to the accompanying drawing.

Figure 11:
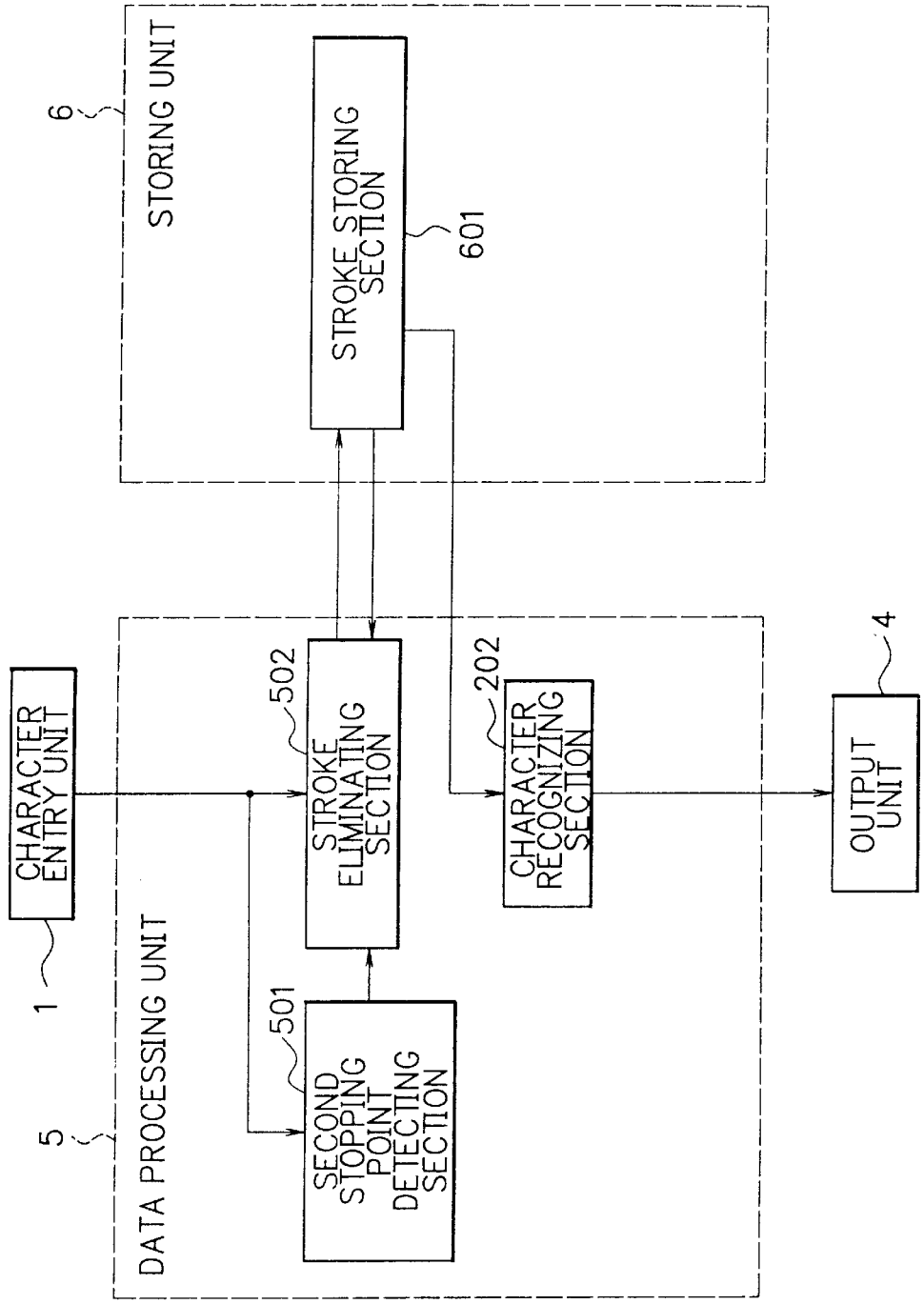
FIG. 11 is a block diagram showing a second embodiment of the present invention.

FIG. 11 is a block diagram showing the second configuration of the present invention. Referring to FIG. 11, the device of the second configuration of the present invention includes a character entry unit 1, a datel processing unit 5 which operates due to program control, a storing unit 6 for storing information, and an output unit 4 consisting of a display means and printer and so forth.

In the second configuration, the character entry unit 1 and the output unit 4 are the same as those of the first configuration, therefore the description thereof is omitted. The storing unit 9 comprises a stroke storing section 601. The stroke storing section 601 stores the stroke pattern transferred from the stroke eliminating section 502.

The data processing unit 5 comprises a second stopping point detecting section 501, a stroke eliminating section 502, and a character recognizing section 202. The second stopping point detecting section 501 implements detection of the stopping point concerning the stroke pattern transferred from the character entry unit 1 and calculation of stopping time, thus transferring the information (hereinafter referring to modified information) in relation thereto to the stroke eliminating section 502. The stroke eliminating section 502 implements elimination of the stroke pattern including the stopping point, or elimination of the stroke pattern group inputted until when the stroke pattern is inputted in accordance with the correction information transferred from the second stopping point detecting section 501. The character recognizing section 202 implements character recognition concerning the stroke pattern stored in the stroke storing section 601.

Figure 12:
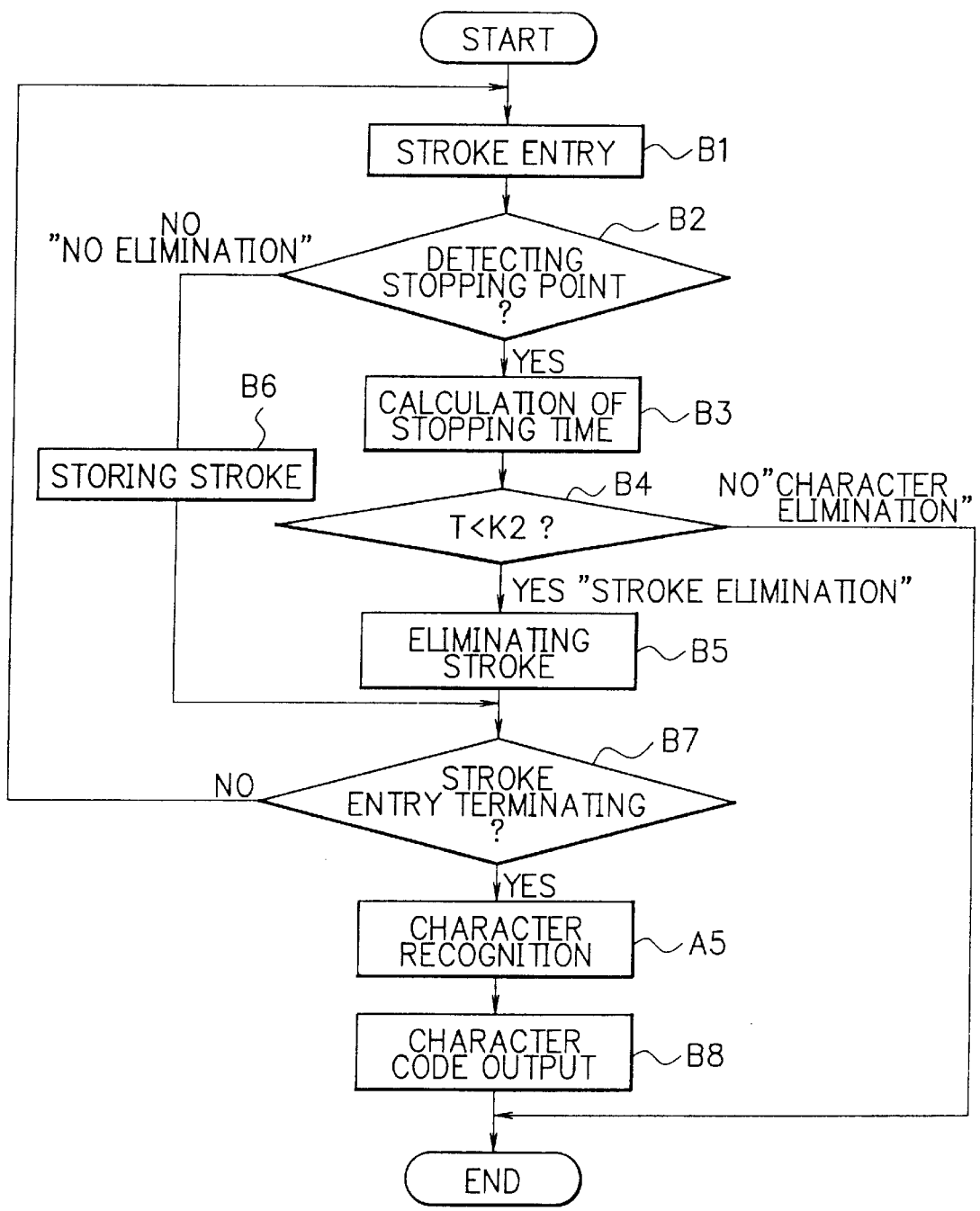
FIG. 12 is a flow chart showing an operation of the second embodiment of the present invention.

Next, operation of the second configuration of the present invention will be described referring to FIGS. 11, 12. FIG. 12 is a flow chart showing operation of the second configuration of the present invention. The character entry unit 1 transfers the stroke pattern which is the row of the coordinate points sampled with fixed time interval both to the second stopping point detecting section 501 and the stroke eliminating section 502 (STEP B1). The second stopping point detecting section 501 examines whether or not the coordinate points having the same coordinate value exist continuously more than K1 pieces (K1 is the value given beforehand) by way of the stopping point concerning the stroke pattern transferred from the character entry unit 1 (STEP B2), when the coordinate point does not exist, making up the correction information to "no elimination", while when the coordinate point exists, obtaining the number of the coordinate points coming to be the stopping point by way of stopping time T (STEP B3). When a plurality of the stopping points exist, the maximum value of the number of the coordinate points which comes to be the stopping points is regarded as the stopping time T. The second stopping point detecting section 501, when the stopping time T is smaller than K2 (K2 is value given beforehand), sets the correction information to "stroke elimination", while when the stopping time T is larger than K2, sets the correction information to "character elimination" (STEP B4). The correction information is transferred to the stroke eliminating section 502. The stroke eliminating section 502, when the correction information is "no elimination", causes the stroke pattern transferred from the character entry unit 1 to be stored in the stroke storing section 601 (STEP B6), while when the correction information is "stroke elimination", causing the stroke pattern transferred from the character entry unit 1 to be eliminated, thus not storing in the stroke storing section 601 (STEP B5). The stroke eliminating section 502, when the correction information is "character elimination", eliminates whole of the stroke pattern transferred from the character entry unit 1 and the stroke pattern group stored in the stroke storing section 601, thus terminating processing. When the stroke pattern for one character is stored in the stroke storing section 601 (STEP B7), the character recognizing section 202 implements recognition concerning the stroke pattern group stored therein (STEP A5). The character recognizing section 202 is the same as that of the first configuration, therefore detailed description is omitted. The output unit 4 receives to output the character code of the recognition result of the character recognizing section 202 (STEP B8).

There is described the effect brought by the second configuration of the present invention. The device of the second configuration of the present invention causes elimination of the stroke or character to be implemented by using stopping point which is capable of setting within the entry stroke, therefore entry of the identification partial stroke is not required so that the burden of the user is not much.

Figures 9, 10:
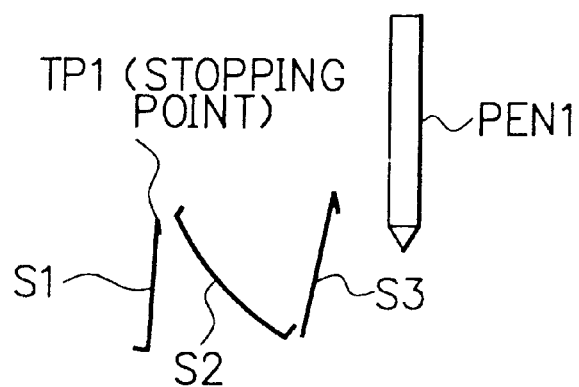
FIG. 9 is a view showing an entry example of the first configuration of the present invention.
FIG. 10 is a view showing an image of data stored in a relevance word correspondence storing section 302 of the first configuration of the present invention.

Next, operation of one embodiment of the first configuration of the present invention will be described in detail referring to FIGS. 7, 8, 9 and 10. FIG. 9 is a view showing an entry example of the first configuration of the present invention. FIG. 10 is a view showing an image of the data stored in the relevance word correspondence storing section 302 of the first configuration of the present invention.

In the first stopping point detecting section 201, there is supposed that K is given by way of K=70. In the relevance word correspondence storing section 302, for example, a pair of the character code and the relevance word as shown in FIG. 10 is stored. There is supposed that the characters consisting of strokes S1, S2, and S3 shown in FIG. 9 are inputted. At the time of entry, there is supposed that a pen point stops moving at the start point of the stroke S1 during time period of two seconds shown by TP1 of FIG. 9, while at another point a pen point does not stop.

Sampling is implemented in such a way that sampling period of the character entry unit 1 is set to 0.025 sec, the stroke patterns P1, P2, and P3 concerning respective strokes S1, S2, and S3 of the inputted characters are stored in the stroke storing section 301 successively (STEP A1). Since the pen point stops moving at the start point of stroke S1 during time period of two seconds, 80 pieces of the coordinate points from the top of the stroke pattern P1 become the same coordinate value. Consequently, since the first stopping point detecting section 201 detects the coordinate points with the same coordinate value which continue more than 70 pieces by way of the stopping point, the starting point of the stroke S1 is detected as the stopping point, thus the first stopping point detecting section 201 makes up the stopping point detection signal to ON to transfer to the relevance word retrieval section 203 (STEP A3). The character recognizing section 202 implements character recognition concerning the stroke pattern group {P1, P2, P3} stored in the stroke storing section 301, thus transferring the character code of the recognition result to the relevance word retrieval section 203 (STEP A5). The relevance word retrieval section 203, if "N" is obtained by way of the character code of the recognition result, since the stopping point detection signal from the first stopping point detecting section 201 is ON, separates the relevance word corresponding to the character code "N" from the relevance word storing section 302. As a result, "NEC corporation" is separated by way of the relevance word to be outputted to the output unit 4 (STEPs A7, A8).

Figure 13:
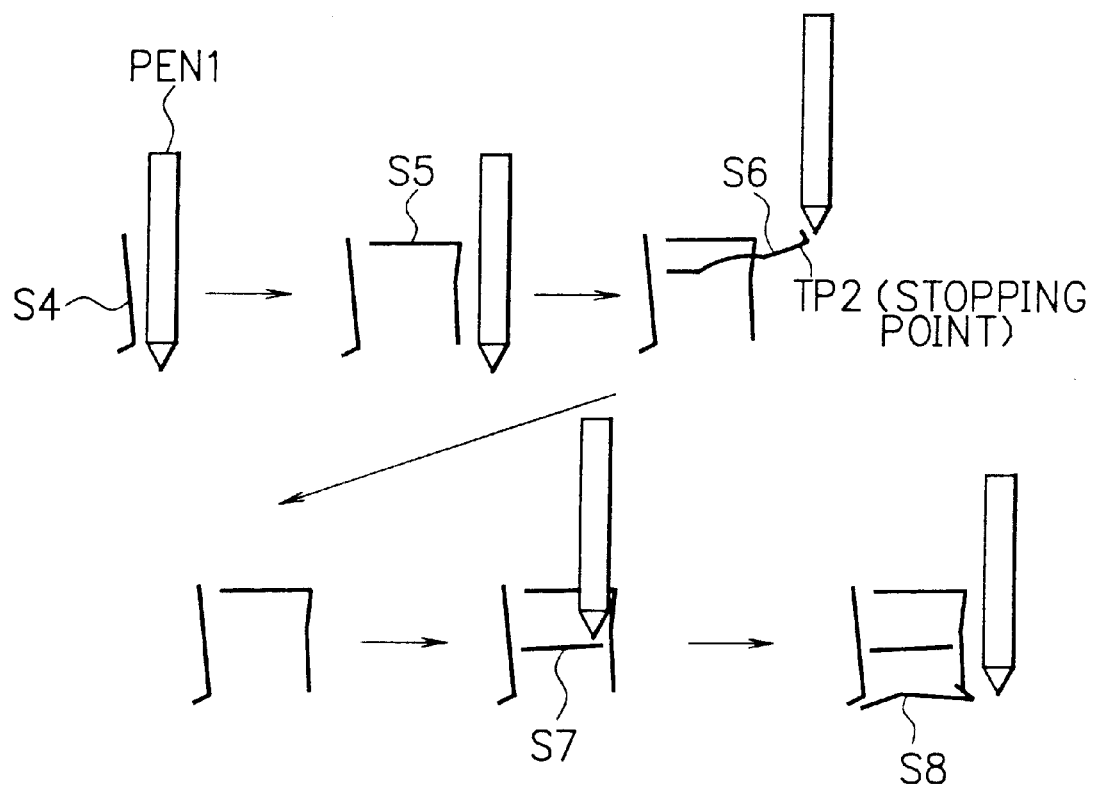
FIG. 13 is a view showing an entry example of the second embodiment of the present invention.

Next, operation of one embodiment of the second configuration will be described in detail referring to FIGS. 11, 12, and 13. FIG. 13 is a view showing an entry example of the second configuration of the present invention. In the second stopping point detecting section 501, there is supposed that K is given by way of K1=80, K2=160 beforehand. There is supposed that the strokes S4, S5, S6, S7, and S8 shown in FIG. 13 are inputted successively. There is supposed that at the time of entry, there is supposed that a pen point stops moving at the end point of the stroke S6 during time period of three seconds shown by TP2 of FIG. 13, while at another point a pen point does not stop.

The character entry unit 1 transfers the stroke pattern P4 which is the row of the coordinate points obtained by sampling with the time period of 0.025 seconds concerning the stroke S4 both to the second stopping point detecting section 501 and the stroke eliminating section 502 (STEP B1). The second stopping point detecting section 501 detects coordinate point having continuously the same coordinate value more than 80 pieces by way of the stopping point. However, since there does not exist in the stroke pattern P4 such coordinate points, the stopping point is not detected, thus the second stopping point detecting section 501 transfers the correction information to the stroke eliminating section 502 by way of "no elimination". The stroke eliminating section 502, since the correction information is "no elimination", stores the stroke pattern P4 transferred from the character entry unit 1 in the stroke storing section 601 (STEP B6). The same operation to the stroke S5 is implemented, thus the stroke pattern P5 concerning the stroke S5 is stored in the stroke storing section 601.

Next, the processing concerning the stroke S6 is implemented. In the stroke S6, since the pen point stops the time period of three seconds at the end point, the coordinate points of 120 pieces from the end of the stroke pattern P6 concerning the stroke S6 obtained by the character entry unit 1 become the same coordinate value. Consequently, the second stopping point detecting section 501 detects the end point of the stroke S6 by way of the stopping point (STEP B2). The stopping time T becomes 120, thus T meets T<K2 so that the second stopping point detecting section 501 transfers the correction information to the stroke eliminating section 502 by way of "stroke elimination". The stroke eliminating section 502, since the correction information is "stroke elimination", eliminates the stroke pattern P6 transferred from the character entry unit 1, thus not storing in the stroke storing section 601 (STEP B5).

Successively, the strokes S7, S8 are inputted, the stroke patterns P7, P8 concerning respective the strokes S7, S8 similar to the strokes S4, S5, are stored in the stroke storing section 601. The stroke pattern P8 is stored therein (STEP B7), before the character recognizing section 202 implements the character recognition concerning the stroke pattern group {P4, P5, P7, P8} stored in the stroke storing section 601 (STEP A5), thus transferring the character code of the recognition result to the output unit (STEP B8).

In the first configuration, there is described the relevance word retrieval section by way of specified operation section for example, and the second configuration, there is described the stroke eliminating section by way of specified operation section for example, however, the present invention is not restricted by these configurations. It is capable of thinking change of character category or change of dictionary instead of these configurations by way of specified operation section.

In the first and the second configurations, it causes control of operation to be described by using one stopping point or existence of the stopping point. However, it is suitable that a plurality of stopping points are in use for controlling operation. For example, in the case of the first configuration, it causes a plurality of relevance word according to one character code to be stored in the relevance word correspondence storing section, thus it is capable of selecting the relevance word which is separated due to the number of the stopping points. In the case of the second configuration, it is capable of controlling the number of stroke pattern to be eliminated among the stroke pattern group stored in the stroke storing section according to the number of the stopping points.

It is also capable of controlling above described operation by using position of the stopping point such as start point or end point of the stroke or stopping time instead of the number of the stopping point. In the second configuration, two values of K1, K2 are in use for threshold value of the stopping point, however, it is suitable to control operation by using more than three values. In the first and the second configurations, the threshold value concerning the stopping time T is constant, however, it is capable of varying in accordance with writer or writing speed. For example, when the writing speed is high, it causes the threshold value to be set to small value, while when the writing speed is low, it causes the threshold value to be set to large value according to the writing speed.

The stopping points are coordinate points having the same coordinate value, however it is capable of making up the coordinate points which have the coordinate value within certain prescribed limits.

It is unnecessary to limit on the citation document (1) in regard to the character recognizing method of the character recognizing section 202, for example, it is suitable to use the character recognition method of "Stroke Order Free On-Line Handwritten Character Recognition Algorism" in [Paper of The Institute of Electronic and Communication Engineers] Vol. J65-D No. 6 (1982, June) pp 679–686. Further, it is not necessarily to implement character recognition processing.

As described above, the online character entry device according to the present invention, it causes specified operation such as the abbreviation entry or elimination of a stroke or character to be implemented simply. The reason why these operations are implemented by using the stopping points which is capable of setting during character entry instead of using the identification stroke, the identification partial stroke, the button switch and so forth.

Further, the online character entry device according to the present invention, increasing of processing amount is not much. The reason why detection of the stopping point is capable of implementing by only counting the coordinate points having the same coordinate value, thereby, processing amount is not much in comparison with detection of the identification stroke or the identification partial stroke.

Furthermore, the online character entry device according to the present invention, stable operation is implemented. The reason why it is not necessary to detect the identification stroke with unstable shape or the identification partial stroke with the same.

While preferred embodiments of the invention have been described using specific terms, such description for illustrative purpose only, and it is to be understood that changes and variations may be made without departing from the spirit or scope of the following claims.

What is claimed is:

1. An online character entry device comprising:
    a stopping point detecting section which detects a stopping point of an abbreviation entry from which a pen point does not shift during a prescribed time;
    a character recognition section which implements character recognition of said abbreviation entry to form a recognition result; and
    an abbreviation retrieval section which retrieves a word corresponding to said recognition result when said stopping point is detected.

2. An online character entry device as in claim 1, wherein said stopping point of said abbreviation entry is detected within a stroke of said abbreviation entry.

3. An online character entry device comprising:
    a stopping point detecting section which detects a stopping point of an abbreviation entry from which a pen point does not shift during a prescribed time period and measures a stopping time of said pen point;
    a character recognition section which implements character recognition of said abbreviation entry to form a recognition result; and
    an abbreviation retrieval section which retrieves a word corresponding to said recognition result when said stopping point is detected.

4. An online character entry device as in claim 3, wherein said stopping point of said abbreviation entry is detected within a stroke of said abbreviation entry.

5. An online character entry device comprising:
    a character entry unit for receiving an abbreviation entry which includes a row of coordinate points sampled within a prescribed time interval;
    a storing unit including:
        a stroke storing section for storing said abbreviation entry transferred from said character entry unit, and
        a relevance word correspondence storing section for storing a relevance word and a character code which corresponds to said relevance word;
    a data processing unit including:
        a stopping point detecting section which detects a stopping point from which a pen point does not shift during a prescribed time period of said abbreviation entry stored in said stroke storing section, thereby producing a stopping point detection signal in response to said detected stopping point, a character recognizing section which implements character recognition of said abbreviation entry stored in said stroke storing section and transforms said abbreviation entry into said character code, and a relevance word retrieval section which retrieves said relevance word corresponding to said character code of said character recognizing section from said relevance word correspondence storing section; and an output unit including a display that displays said relevance word and a printer.

6. An online character entry device comprising:

a character entry unit for receiving a stroke pattern which includes a row of coordinate points sampled within a prescribed time interval of an inputted character;

a storing section including:
　a stroke storing section, and
　a relevance word correspondence storing section for storing a relevance word;

a data processing unit including:
　a stopping point detecting section which detects a stopping point from which coordinate points of said row of coordinate points have the same coordinate value within said time interval and calculates a stopping time of said stroke pattern transferred from said character entry unit to produce correction information in response to said detected stopping point,
　a stroke eliminating section which eliminates one or more portions of said stroke pattern according to said correction information transferred from said stopping point detecting section and stores the resulting stroke pattern of said elimination in said stroke storing section,
　a character recognition section which implements character recognition of said resulting stroke pattern stored in said stroke storing section to produce a recognized pattern; and
　a relevance word retrieval section which retrieves a relevance word corresponding to said recognized pattern from said relevance word correspondence storing section; and an output unit including a display that displays said relevance word and a printer.

7. A character entry method comprising the steps of:

storing a stroke pattern which includes a row of coordinate points sampled within a prescribed time interval;

examining whether coordinate points of said row of coordinate points having the same coordinate value exist continuously within said stroke pattern during said prescribed time period;

setting a stopping point detection signal to ON when said coordinate points having the same coordinate value exist;

setting a stopping point detection signal to OFF when said coordinate points do not exist;

implementing recognition of said stroke pattern via a recognition system wherein a representative stroke obtained due to clustering of directional characteristics and positional characteristics of said stroke pattern is used to produce a recognition result;

retrieving a relevance word corresponding to said recognition result and outputting said relevance word when said stopping point detection signal is ON; and outputting said recognition result when said stopping point detection signal if OFF.

8. A character entry method comprising the steps of:

obtaining: a stroke pattern which includes a row of coordinate points sampled within a constant time interval;

examining whether coordinate points of said row of coordinate points having the same coordinate value exist continuously within said stroke pattern during said time interval;

setting correction information to "no elimination" when said coordinate points do not exist;

determining a stopping point based on the number of the coordinate points within a stopping time T when said coordinate points exist;

setting correction information to "stroke elimination" when said stopping time T is smaller than a predetermined value;

setting correction information to "character elimination" when said stopping time T is larger than said predetermined value;

implementing recognition of said stroke pattern when said correction information is "no elimination";

eliminating a portion of said stroke pattern when said correction information is "stroke elimination" to produce a stroke eliminated pattern; implementing recognition of said stroke eliminated pattern; and retrieving a word corresponding to said stroke eliminated pattern when said stopping point is determined; and eliminating all of said stroke pattern when said correction information is "character elimination".

9. An online character entry device comprising:

a stopping point detecting section which detects a stopping point of a stroke pattern from which a pen point does not shift during a prescribed time within a stroke of said stroke pattern;

a character change category section which changes from one character category to another character category in response to said detection of said stopping point; and a retrieval section which retrieves a character from said character change category section that corresponds to said stroke pattern.

10. An online character entry device comprising:

a stopping point detecting section which detects a stopping point of a stroke pattern from which a pen point does not shift during a prescribed time within a stroke of said stroke pattern;

a dictionary change section which changes from one dictionary to another dictionary in response to said detection of said stopping point; and a retrieval section which retrieves a character from said dictionary change section that corresponds to said stroke pattern.

* * * * *